(12) United States Patent
Sane et al.

(10) Patent No.: US 9,167,466 B2
(45) Date of Patent: Oct. 20, 2015

(54) ENHANCED MEASUREMENT REPORTING TO IMPROVE THROUGHPUT WHEN USING MULTICARRIER CELLS

(71) Applicant: Apple Inc., Cupertino, CA (US)

(72) Inventors: Sachin J. Sane, Fremont, CA (US); Aravind Radhakrishnan, Campbell, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 14/020,569

(22) Filed: Sep. 6, 2013

(65) Prior Publication Data

US 2014/0064129 A1     Mar. 6, 2014

Related U.S. Application Data

(60) Provisional application No. 61/697,794, filed on Sep. 6, 2012.

(51) Int. Cl.
*H04J 3/06*     (2006.01)
*H04W 24/10*     (2009.01)

(52) U.S. Cl.
CPC ................................... *H04W 24/10* (2013.01)

(58) Field of Classification Search
CPC .... H04B 1/7183; H04B 1/719; H04B 1/7073; H04B 1/70735; H04B 1/7083; H04B 1/7085; H04B 1/7087; H04L 7/08; H04L 7/10
USPC .................................................. 370/503–520
See application file for complete search history.

(56) References Cited

U.S. PATENT DOCUMENTS

| | | | |
|---|---|---|---|
| 7,363,039 B2 | 4/2008 | Laroia et al. | |
| 7,468,962 B2 | 12/2008 | Belotserkovsky et al. | |
| 8,121,590 B2 | 2/2012 | Kazmi et al. | |
| 8,149,772 B2 | 4/2012 | Sumasu et al. | |
| 2003/0128787 A1* | 7/2003 | Terasawa et al. | 375/367 |
| 2004/0008758 A1* | 1/2004 | Ando | 375/150 |
| 2009/0028095 A1 | 1/2009 | Kish | |
| 2013/0100823 A1* | 4/2013 | Ren et al. | 370/241 |

\* cited by examiner

*Primary Examiner* — Thai Hoang
(74) *Attorney, Agent, or Firm* — Downey Brand LLP

(57) ABSTRACT

A method for measurement reporting to improve throughput when using multicarrier cells is disclosed. The method can include a wireless communication device performing a first measurement of a primary carrier and performing a second measurement of a secondary carrier. The method can further include the wireless communication device deriving a combined measurement as a function of the first measurement and the second measurement. The method can also include the wireless communication device reporting the combined measurement to a serving network.

20 Claims, 7 Drawing Sheets

ENHANCED MEASUREMENT REPORTING TO IMPROVE THROUGHPUT WHEN USING MULTICARRIER CELLS

CROSS-REFERENCE TO RELATED APPLICATIONS

This application claims priority to U.S. Provisional Patent Application No. 61/697,794, filed on Sep. 6, 2012, which is incorporated herein in its entirety by reference.

FIELD OF THE DESCRIBED EMBODIMENTS

The described embodiments generally relate wireless communications technology, more particularly to enhanced measurement reporting to improve throughput when using multicarrier cells.

BACKGROUND

Endeavors to develop improved cellular networks providing greater throughput to support faster data transfer rates is ongoing. One area in which development is occurring is the development of dual carrier cells. In dual carrier cells, a wireless communication device can be assigned two frequency carriers that can be used concurrently to support higher throughput.

For example, dual carrier high-speed packet access (HSPA) technology is being deployed widely in areas such as the United States, Canada, and Europe. In dual carrier HSPA, instead of a device being assigned a single 5 megahertz (MHz) carrier, two adjacent 5 MHz carriers are used. Both of the carriers can be capable of equal throughputs. When a device initiates a data transfer, the device usually initiates the data transfer on a single carrier. The network can subsequently configure the device with a secondary carrier and set up radio bearers so that the device can use both carriers to support the data transfer.

A wireless communication device configured with dual carriers can send measurement reports to the serving network that can be used by the network to make handover decisions (e.g., decisions to change the serving cell). However, wireless communication devices configured with dual carriers typically perform measurement reporting based only on the primary carrier. While relying only on measurement of the primary carrier can work in many cases, it can be a problem if the device's secondary carrier is impacted by a high level of interference and/or loading, which can affect the channel quality and, thus, the throughput available on the secondary carrier. In such a situation, the device may enjoy a high level of throughput on the primary carrier, but may have a low throughput level on the secondary carrier. As such, while the primary carrier can provide a good level throughput for the device, the overall throughput of the carriers configured for the device can be reduced due to the low throughput on the secondary carrier. However, since reporting is based only on the primary carrier, the network can determine to maintain the device on the present dual carrier pair due to the high quality reported for the primary carrier and, thus, the device can remain stuck with the dual carrier pair in spite of the low overall throughput of the dual carrier pair.

BRIEF SUMMARY OF SOME DISCLOSED EMBODIMENTS

Some embodiments disclosed herein provide enhanced measurement event reporting, which can improve the throughput realized by a wireless communication device when using multicarrier cells. More particularly, some example embodiments provide a wireless communication device configured to derive a combined measurement based on measurements taken for each of a plurality of carriers in a set of carriers including a primary carrier and one or more secondary carriers. In this regard, the combined measurement can be reflective of an aggregate throughput and/or other aggregate quality of the set of carriers rather than just the quality of the primary carrier in the carrier set. The combined measurement can be reported to the serving network such that handover decisions can be based on an overall quality for a set of carriers rather than only on the primary carrier in a set of carriers. Wireless communication devices implementing such embodiments can accordingly benefit from a greater realized throughput when using multiple carriers, as devices in accordance with such embodiments can be transitioned by the network to a cell having a set of carriers providing the best aggregate quality rather than being forced to remain on a cell having a primary carrier that is providing a high throughput, but that is not providing a high overall throughput because the quality of the secondary carrier is subpar.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Some embodiments disclosed herein provide enhanced measurement event reporting, which can improve the throughput realized by a wireless communication device when using multicarrier cells. More particularly, some example embodiments provide a wireless communication device configured to derive a combined measurement based on measurements taken for each of a plurality of carriers in a set of carriers including a primary carrier and one or more secondary carriers. In this regard, the combined measurement can be reflective of an aggregate throughput and/or other aggregate quality of the set of carriers rather than just the quality of the primary carrier in the carrier set. The combined measurement can be reported to the serving network such that handover decisions can be based on an overall quality for a set of carriers rather than only on the primary carrier in a set of carriers.

Figure 1:
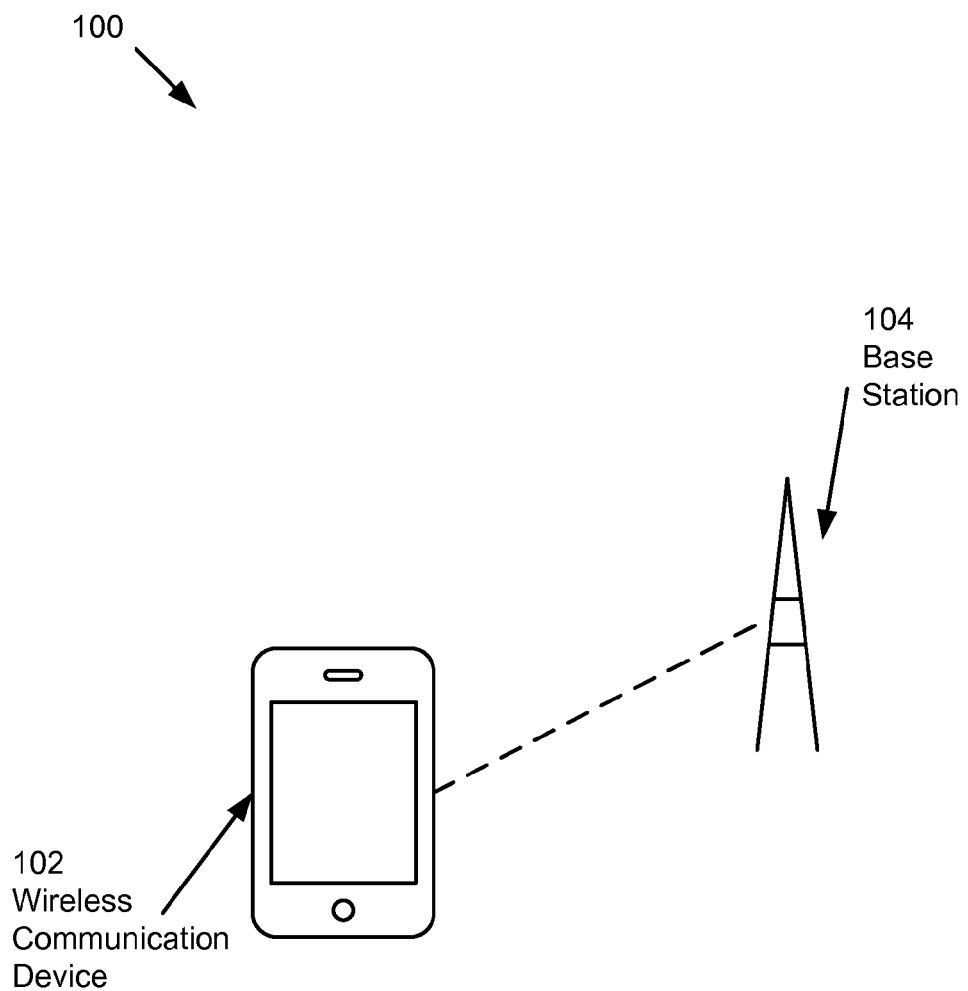
FIG. 1 illustrates a wireless communication system in accordance with some example embodiments.

FIG. 1 illustrates a wireless communication system 100 in accordance with some example embodiments. The system 100 can include a wireless communication device 102. The wireless communication device 102 can be any computing device configured to wirelessly access a network via a base station 104 and operate in the wireless communication system 100 in accordance with various example embodiments. By way of non-limiting example, the wireless communication device 102 can be embodied as a cellular phone, such as a smart phone device, a tablet computing device, a laptop computer, or other computing device that can be configured to wirelessly access a network via a base station 104 or other suitable network access point.

The system 100 can further include one or more base stations 104. For example, the system 100 can include a base station 104 associated with a cell serving the wireless communication device 102, which can serve as the serving base station for the wireless communication device 102. The system 100 can further include one or more base stations 104 that can be associated with respective neighbor cells of a serving cell of the wireless communication device 102. Each base station 104 can be embodied as any of a variety of cellular base stations, such as by way of non-limiting example, a base transceiver station (BTS), node B, evolved node B (eNB), some combination thereof, or the like.

The wireless communication device 102 can be configured to access a network via a base station 104 using any present or future developed radio access technology (RAT) that can support multiple carriers. In this regard, a base station 104 can be configured to support providing network access to wireless communication device 102 via multiple carriers. By way of non-limiting example, in some example embodiments, the wireless communication device 102 can be configured to use a multi-carrier HSPA RAT to access a network via a base station 104. As another example, in some example embodiments, the wireless communication device 102 can be configured to use a multi-carrier Long Term Evolution (LTE) RAT, such as LTE-Advanced (LTE-A) to access a network via a base station 104. It will be appreciated, however, that the foregoing example cellular RATs are provided by way of example, and not by way of limitation. As such, it will be appreciated that techniques disclosed herein for enhanced measurement reporting when using multicarrier cells can be applied mutatis mutandis to any present or future-developed RAT supporting the use of multiple carriers by a wireless communication device.

Figure 2:
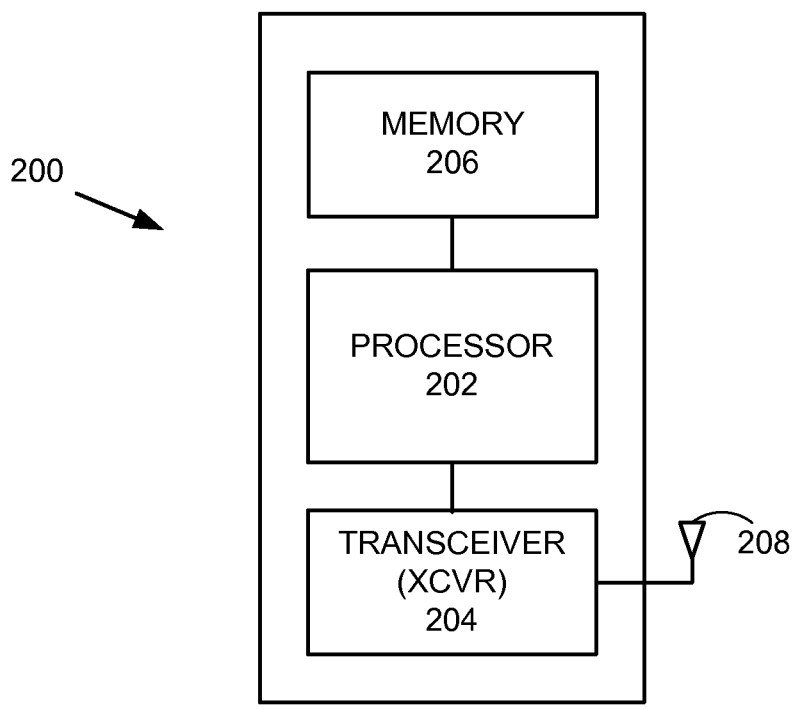
FIG. 2 illustrates a block diagram of an example apparatus that can be implemented on a wireless communication device in accordance with some example embodiments.

The wireless communication device 102 can accordingly be configured by a serving network with a carrier set including multiple carriers (e.g., two or more carriers). Carriers in a carrier set can be located on adjacent frequency bands, or can be located on non-adjacent frequency bands FIG. 2 illustrates a block diagram of an example apparatus 200 that can be implemented on a wireless communication device, such as wireless communication device 102, in accordance with some example embodiments. The apparatus 200 can include a processor 202 coupled with memory 206 and also coupled with a wireless transceiver(s) 204, which can, in turn, be coupled with an antenna 208. Processor 202 can be configured to read, write and execute processor instructions stored in memory 206. Processor 202 can also be configured to control wireless transceiver(s) 204. In some embodiments, wireless transceiver 204 can connect to wireless networks, via an access point, such as a base station 104. In some example embodiments, the processor 202 can be configured, such as through hardware, software, firmware, or some combination thereof, to control one or more operations that can be performed by a wireless communication device 102 in accordance with various example embodiments.

Figure 3:
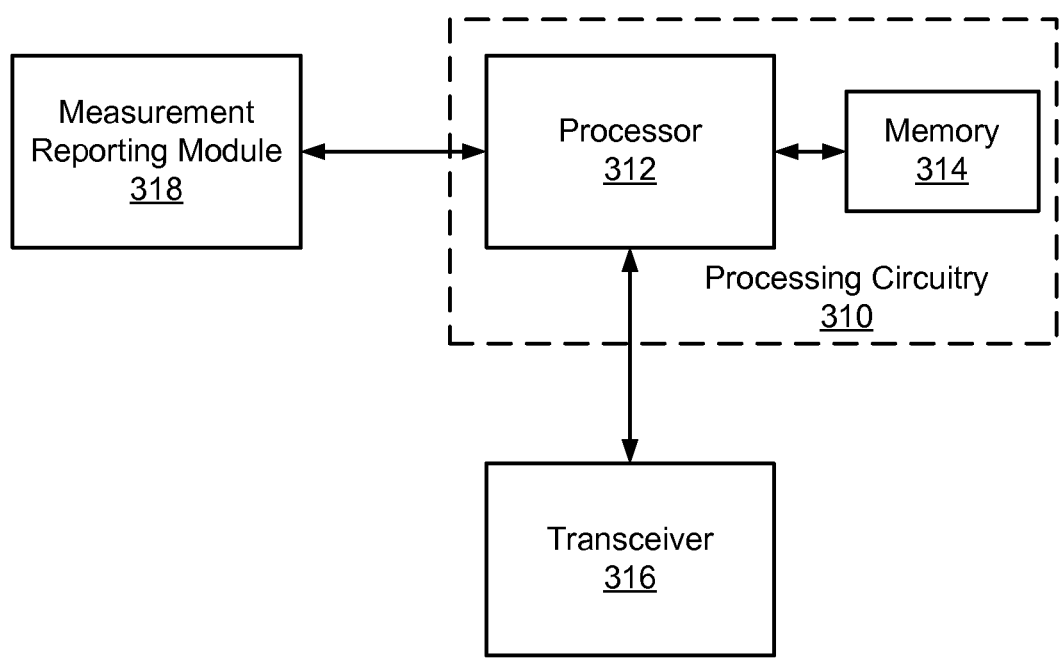
FIG. 3 illustrates a block diagram of another example apparatus that can be implemented on a wireless communication device in accordance with some example embodiments.

FIG. 3 illustrates a block diagram of another example apparatus that can be implemented on a wireless communication device, such as wireless communication device 102, in accordance with some embodiments. In this regard, FIG. 3 illustrates an apparatus 300 that can, when implemented on a computing device, such as wireless communication device 102, enable the computing device to operate within the system 100 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of a wireless communication device in accordance with various example embodiments, and thus can provide means for performing functionalities of wireless communication device 102 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 100 when implemented on or otherwise operably coupled to the computing device. For example, in some embodiments, one or more components of the apparatus 300 can provide baseband circuitry that can be configured to enable a computing device, such as wireless communication device 102, to access and communicate over a wireless network using one or more RATs In some example embodiments, the processing circuitry 310 can include a processor 312 and, in some embodiments, such as that illustrated in FIG. 3, can further include memory 314. The processor 312 can, for example, be an embodiment of the processor 202. The memory 314 can, for example, be an embodiment of the memory 206. As such, in some example embodiments, the processing circuitry 310 can be at least partially embodied by the processor 202 and/or memory 206. The processing circuitry 310 can be in communication with, control, and/or otherwise be coupled with a transceiver 316 and/or measurement reporting module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can include a plurality of processors. The plurality of processors can be in operative communication with each other and can be collectively configured to perform one or more functionalities of a communication device as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver 316, or measurement reporting module 318 via a bus (or buses) for passing information among components of the apparatus 300.

The apparatus 300 can further include one or more transceivers 316. The transceiver 316 can, for example, be an embodiment of the transceiver 204. The transceiver 316 can be configured to enable the apparatus 300 to send (e.g., transmit) wireless signals to and receive wireless signals from a wireless network via a connection to a network access point, such as the wireless network access point 104. As such, the transceiver 316 can be configured to support any type of RAT that may be used to support communication over a wireless channel between a wireless communication device and a network. Thus, for example, the transceiver 316 can be configured to support communication via any type of RAT that can be used for communication between the wireless communication device 102 and a wireless network access point 104. In instances in which the wireless communication device 102 is configured for using multiple carriers, the transceiver 316 can support communication with a network via multiple carriers.

The apparatus 300 can further include measurement reporting module 318. The measurement reporting module 318 can be embodied as various means, such as circuitry, hardware, a computer program product comprising a computer readable medium (for example, the memory 314) storing computer readable program instructions that are executable by a processing device (for example, the processor 312), or some combination thereof.

The measurement reporting module 318 can be configured to derive and report measurements in accordance with one or more example embodiments disclosed herein. In this regard, the wireless communication device 102 can be configured, such as by the serving network, to report carrier measurements that can be used by the network to determine a best cell configuration for the wireless communication device 102. For example, the wireless communication device 102 can be configured to report a measurement event indicative of a change of best cell for the wireless communication device 102. For example, in some example embodiments, such as some example embodiments in which the wireless communication device 102 is configured to use HSPA, the wireless communication device 102 can be configured to report Event 1$d$ measurement events to indicate a change of best cell. It will be appreciated, however, that the wireless communication device 102 can be configured to report any measurement and/or measurement event that can be used by a serving network to make a cell selection decision for a wireless communication device using a multicarrier cell.

The wireless communication device 102 can accordingly be configured to perform carrier measurements for a serving cell and/or for one or more alternative cells (e.g., neighboring cells). For example, the wireless communication device 102 can be configured to measure a quality of a signal received from a base station 104 associated with the serving cell and/or from a base station 104 associated with a neighbor cell. The measured quality can include any measurement parameter that can be indicative of a quality of a carrier, and can be indicative of a throughput available to the wireless communication device 102 on the carrier. For example, the wireless communication device 102 can be configured to measure a carrier-to-noise ratio ($E_c/N_o$) of a carrier, a signal to noise ration (SNR) of a carrier, a signal to interference plus noise ratio (SINR) of a carrier, a received signal code power (RSCP) of a carrier, a received signal strength indicator (RSSI) of a carrier, a channel quality indicator (CQI) of a carrier, a reference signal received quality (RSRQ) of a carrier, a reference signal received power (RSRP) of a carrier, and/or the like.

In accordance with some example embodiments, the wireless communication device 102 (e.g., a measurement reporting module 318 associated with the wireless communication device 102) can be configured to derive a combined measurement that can be defined as a function of a measurement of a primary carrier and a measurement of each of one or more secondary carriers in a carrier set. As such, the combined measurement can be reflective of an overall quality of a set of carriers rather than just the primary carrier. In this regard, the combined measurement can be indicative of a combined total throughput available to the wireless communication device 102 from the carriers in the carrier set. The combined measurement can be defined in terms of any measurement parameter that can be measured for a carrier and reported to a network to indicate a measured quality of a carrier. For example, in some embodiments, the combined measurement can be defined in terms of an $E_c/N_o$ for the set of carriers. As a further example, in some embodiments, the combined measurement can additionally or alternatively be defined in terms of SNR, SINR, a RSCP, RSSI, CQI, RSRQ, RSRP, and/or the like.

The combined measurement can be used by the serving network to make cell selection and carrier configuration decisions on the basis of an overall throughput of a set of carriers rather than solely on a primary carrier. Accordingly, a best multicarrier set can be determined for the wireless communication device 102 rather than just a best primary carrier. Thus, in situations in which a primary carrier for the wireless communication device 102 is offering a good throughput level, but a secondary carrier is providing poor throughput due to a high level of interference or otherwise low channel quality, such as my be indicted through a reported channel quality indicator (CQI), the wireless communication device 102 can be moved, based on a reported combined measurement, to a carrier set offering a better overall throughput rather than remaining stuck on the carrier set providing poor overall throughput.

In some example embodiments, if a wireless communication device 102 is configured with multiple carriers and a synchronization code, such as a primary synchronization code (PSC), on both the primary and secondary carriers is the same, then the measurement reporting module 318 can be configured to control the wireless communication device 102 to perform measurements on both the primary carrier and the secondary carrier(s) and derive a combined measurement to report to the network rather than just measuring and reporting a measurement for the primary carrier. If, however, a primary carrier and a secondary carrier use different synchronization codes, the wireless communication device 102 can be configured to report a measurement of the primary carrier rather than deriving and reporting a combined measurement based on both the primary carrier and the secondary carrier(s).

Similarly, in some example embodiments, if a synchronization code (e.g., a PSC) is the same for both (or multiple) carriers on a neighbor cell, then a neighbor cell report can be based on a combined measurement for multiple carriers on the neighbor cell rather than just the primary carrier of the neighbor cell. In some example embodiments, if the synchronization code is the same for both the primary carrier and secondary carrier of a serving cell, the measurement reporting module 318 can be configured to assume that the primary carrier and secondary carrier(s) of a neighbor cell can share a common synchronization code such that a combined measurement can be derived and reported for the neighbor cell.

Figure 4:
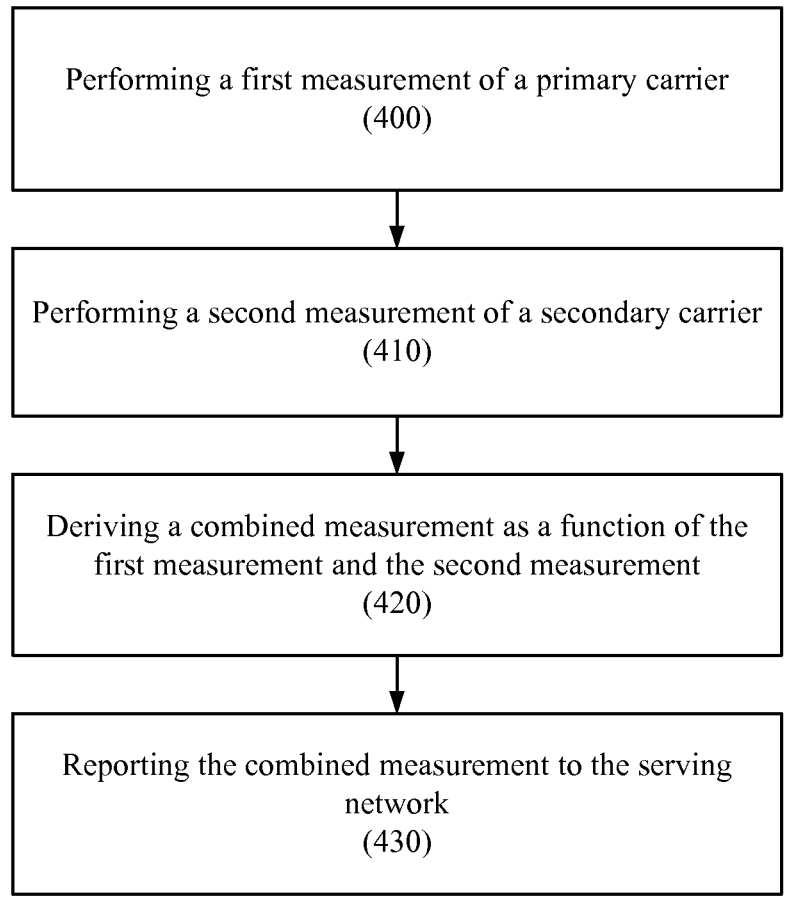
FIG. 4 illustrates a flowchart according to an example method for enhanced measurement reporting to improve throughput when using multicarrier cells in accordance with some example embodiments.

FIG. 4 illustrates a flowchart according to an example method for enhanced measurement reporting to improve throughput when using multicarrier cells in accordance with some example embodiments. In this regard, FIG. 4 illustrates operations that can be performed by a wireless communication device, such as wireless communication device 102, in accordance with some example embodiments. One or more of processor 202, transceiver 204, memory 206, processing circuitry 310, processor 312, memory 314, transceiver 316, or measurement reporting module 318 can, for example, provide means for performing one or more of the operations illustrated in and described with respect to FIG. 4.

Operation 400 can include the wireless communication device 102 performing a first measurement of a primary carrier. The measurement of the primary carrier can, for example, include measurement of an $E_c/N_o$, SNR, SINR, a RSCP, RSSI, CQI, RSRQ, RSRP, and/or other measurement that can be indicative of an available throughput and/or other quality for the primary carrier.

Operation 410 can include the wireless communication device 102 performing a second measurement of a secondary carrier. The second measurement can, for example, include measurement of an $E_c/N_o$, SNR, SINR, a RSCP, RSSI, CQI, RSRQ, RSRP, and/or other measurement that can be indicative of an available throughput and/or other quality for a secondary carrier. In embodiments in which a dual carrier configuration is implemented, a measurement can be performed for only a single secondary carrier. However, in embodiments, such as that illustrated in and described with respect to FIG. 6 below, in which a multicarrier configuration using three or more carriers is implemented, operation 410 can include performing measurements for multiple secondary carriers.

The measurements performed in operations 400 and 410 can be performed based on a PSC and/or other synchronization code of each respective carrier for which a measurement is performed. In some instances, the synchronization codes (e.g., PSCs) of the primary and secondary carrier(s) can be the same. In some embodiments, such as that illustrated in and described below with respect to FIG. 7, if the same synchronization code is used by the carriers in a carrier set, then a measurement of the secondary carrier(s) can be performed in operation 410 and the method can proceed with operations 420 and 430 as described below to derive and report a combined measurement for the carrier set. If, however, different synchronization codes are used by the primary carrier and a secondary carrier, the wireless communication device 102 can instead report a measurement of the primary carrier and can omit performance of operations 420 and 430.

Operation 420 can include deriving a combined measurement as a function of the first measurement and the second measurement(s). It will be appreciated that in multicarrier configurations using three or more carriers, such as that illustrated in and described with respect to FIG. 6 below, operation 420 can be scaled to include deriving a combined measurement as a function of three or more measurements.

The combined measurement can be defined in terms of any unit that can be indicative of an aggregate quality of the carrier set. For example, the combined measurement can be defined in a unit that can be indicative of a combined total throughput available to the wireless communication device form the carrier set. By way of non-limiting example, the combined measurement can be defined as an $E_c/N_o$, SNR, SINR, a RSCP, RSSI, CQI, RSRQ, RSRP, and/or the like.

In some example embodiments, operation 420 can include deriving an average of the values measured in operations 400 and 410.

As another example, in some embodiments, operation 420 can include deriving a weighted average of the measurements. For example, weights can be assigned to the carrier measurements based on a traffic load handled by each respective carrier. For example, in some embodiments, more traffic sent to/from the wireless communication device 102 can be handled by the primary carrier than a secondary carrier. Thus, for example, a first weight can be applied to the measurement of the primary carrier and a second weight can be applied to the measurement of the secondary carrier, with the first weight being greater than the second weight. The combined measurement can be derived as an average of the weighted measurements. An example method for deriving a combined measurement from weighted measurements that can be performed attendant to performance of operation 420 is illustrated in and described with respect to FIG. 5 below.

Operation 430 can include the wireless communication device 102 reporting the combined measurement to a serving network. For example, the combined measurement can be signaled in a measurement report to a serving base station 104. The combined measurement can be included in a measurement report that can be used by the serving network to make a cell selection decision for the wireless communication device 102. For example, the combined measurement can be included in a measurement report that can be indicative of a change of best cell for the wireless communication device 102, such as an Event 1*d* report.

Operations 400-430 can be performed for measuring and reporting carriers for a serving cell and/or for a neighbor cell. As such, a combined measurement determined and reported in accordance with operations 400-430 can be used by the network as a basis for making a handover decision and/or for otherwise assigning a multicarrier configuration to the wireless communication device 102.

Figure 5:
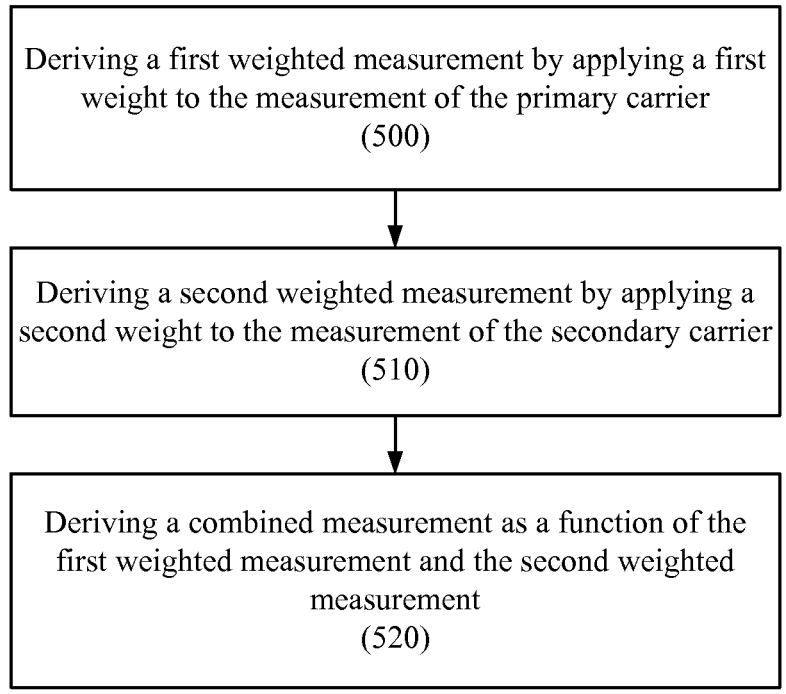
FIG. 5 illustrates a flowchart according to an example method for deriving a combined measurement in accordance with some example embodiments.

FIG. 5 illustrates a flowchart according to an example method for deriving a combined measurement in accordance with some example embodiments. More particularly, FIG. 5 illustrates a method that can be performed attendant to performance of operation 420 in accordance with some example embodiments in which the combined measurement can be derived as a function of weighted measurements of the carriers in a carrier set. One or more of processor 202, transceiver 204, memory 206, processing circuitry 310, processor 312, memory 314, transceiver 316, or measurement reporting module 318 can, for example, provide means for performing one or more of the operations illustrated in and described with respect to FIG. 5.

Operation 500 can include the wireless communication device 102 deriving a first weighted measurement by applying a first weight to the measurement of the primary carrier. Operation 510 can include the wireless communication device 102 deriving a second weighted measurement by applying a second weight to the measurement of the secondary carrier. In instances in which the carrier set includes multiple secondary carriers, operation 510 can include deriving multiple second weighted measurements, each of which can be derived using a different respective weight. In some example embodiments, the first weight can be greater than the second weight(s), as, in some example embodiments, the measurement of the primary carrier can be accorded a greater weight than the secondary carrier measurement(s).

Operation 520 can include the wireless communication device 102 deriving a combined measurement as a function of the first weighted measurement and the second weighted measurement(s). For example, operation 520 can include deriving an average of the weighted measurements.

Figure 6:
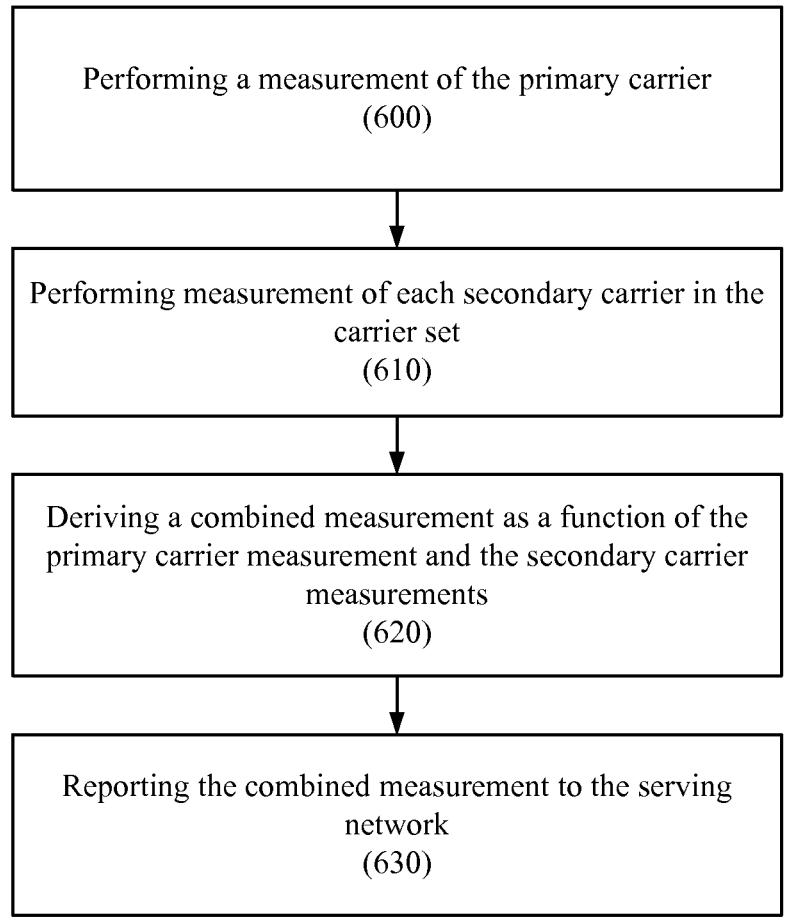
FIG. 6 illustrates a flowchart according to an example method for enhanced measurement reporting for a carrier set including three or more carriers in accordance with some example embodiments.

FIG. 6 illustrates a flowchart according to an example method for enhanced measurement reporting for a carrier set including three or more carriers in accordance with some example embodiments. In this regard, FIG. 6 illustrates an embodiment of the method of FIG. 4 that can be performed in an instance in which a carrier set includes multiple secondary carriers. One or more of processor 202, transceiver 204, memory 206, processing circuitry 310, processor 312, memory 314, transceiver 316, or measurement reporting module 318 can, for example, provide means for performing one or more of the operations illustrated in and described with respect to FIG. 6.

Operation 600 can include the wireless communication device 102 performing a measurement of the primary carrier. In this regard, operation 600 can, for example, correspond to an embodiment of operation 400.

Operation 610 can include the wireless communication device 102 performing a measurement of each secondary carrier in the carrier set. In this regard, operation 610 can, for example, correspond to an embodiment of operation 410 in which multiple secondary carrier measurements can be performed.

Operation 620 can include the wireless communication device 102 deriving a combined measurement as a function of the primary carrier measurement and the secondary carrier measurements. The combined measurement can, for example, be an average of the primary carrier measurement and the secondary carrier measurements. As another example, operation 620 can include applying respective weights to the primary carrier measurement and the secondary carrier measurements and deriving the combined measurement as a function of the weighted measurements, such as in accordance with the method of FIG. 5. Operation 620 can, for example, correspond to an embodiment of operation 420.

Operation 630 can include the wireless communication device 102 reporting the combined measurement to the serving network. In this regard, operation 630 can, for example, correspond to an embodiment of operation 430.

Figure 7:
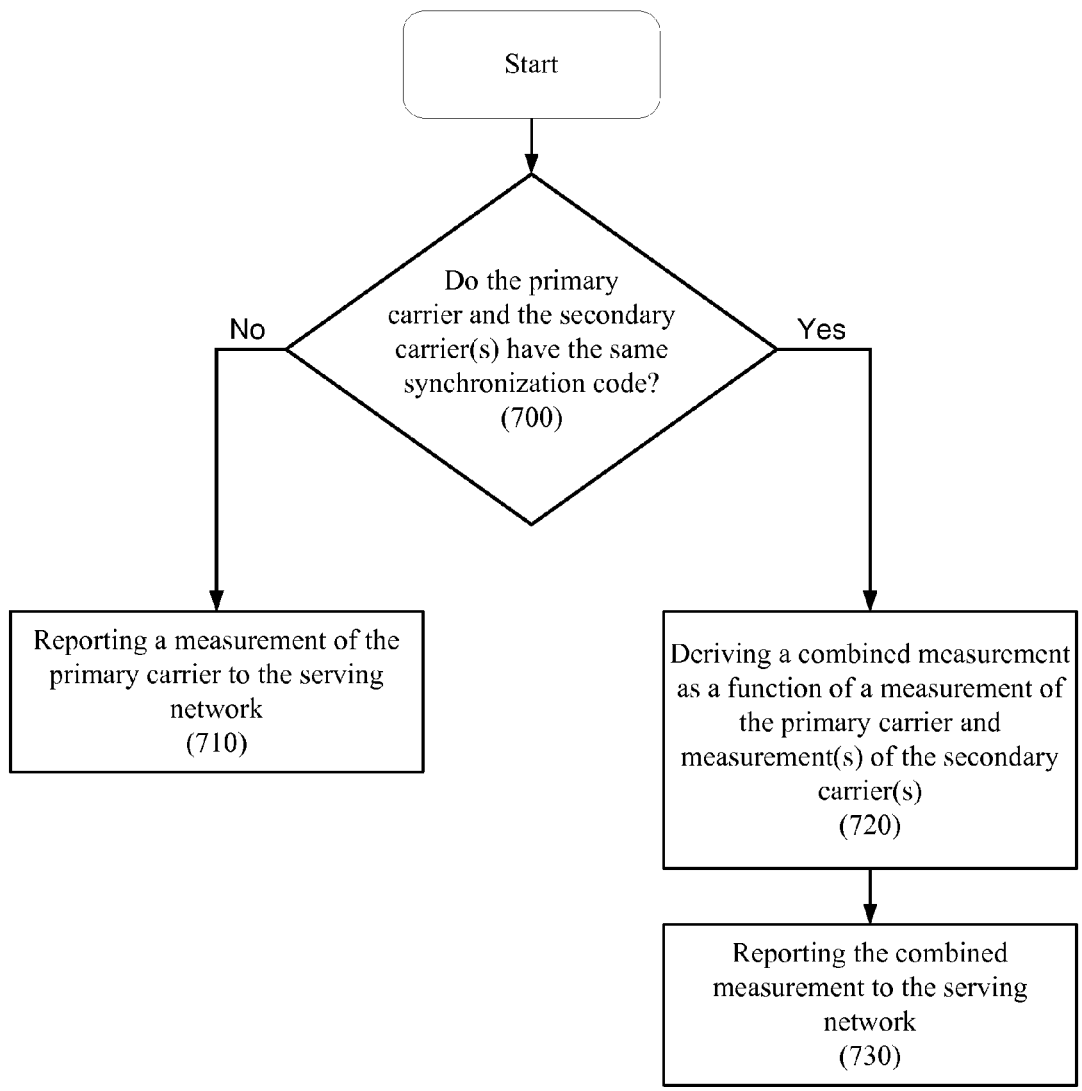
FIG. 7 illustrates a flowchart according to another example method for enhanced measurement reporting to improve throughput when using multicarrier cells in accordance with some example embodiments.

FIG. 7 illustrates a flowchart according to another example method for enhanced measurement reporting to improve throughput when using multicarrier cells in accordance with some example embodiments. More particularly, FIG. 7 illustrates an embodiment in which a combined measurement can be derived and reported if the carriers in the carrier set use the same synchronization code. The operations illustrated in FIG. 7 can be performed by a wireless communication device, such as wireless communication device 102, in accordance with some example embodiments. One or more of processor 202, transceiver 204, memory 206, processing circuitry 310, processor 312, memory 314, transceiver 316, or measurement reporting module 318 can, for example, provide means for performing one or more of the operations illustrated in and described with respect to FIG. 7.

Operation 700 can include the wireless communication device 102 determining whether the primary carrier and the secondary carrier(s) have the same synchronization code.

In an instance in which it is determined at operation 700 that the primary carrier and the secondary carrier do not have the same synchronization code, the method can proceed to operation 710, which can include the wireless communication device 102 reporting a measurement of the primary carrier to the serving network. In this regard, in some example embodiments, if the carriers in the carrier set do not use the same synchronization code, a measurement of the primary carrier can be reported rather than a combined measurement.

If, however, it is determined at operation 700 that the primary carrier and the secondary carrier do have the same synchronization code, the method can instead proceed to operation 720, which can include the wireless communication device 102 deriving combined measurement as a function of a measurement of the primary carrier and measurement(s) of the secondary carrier(s). Operation 720 can, for example, correspond to an embodiment of operation 420 and/or operation 620. In some example embodiments, the method of FIG. 5 can be performed attendant to performance of operation 720. Operation 730 can include the wireless communication device 102 reporting the combined measurement to the serving network. In this regard, operation 730 can, for example, correspond to an embodiment of operation 430 and/or operation 630.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for measurement reporting to improve throughput when using multicarrier cells, the method comprising a wireless communication device:
   performing a first measurement of a primary carrier;
   reporting the first measurement to a serving network in an instance in which the primary carrier has a different synchronization code than a secondary carrier; and
   in an instance in which the primary carrier has a same synchronization code as the secondary carrier:
      performing a second measurement of the secondary carrier;
      deriving a combined measurement as a function of the first measurement and the second measurement; and
      reporting the combined measurement to the serving network.

2. The method of claim 1, wherein deriving the combined measurement comprises averaging the first measurement and the second measurement.

3. The method of claim 1, wherein deriving the combined measurement comprises:
   deriving a first weighted measurement by applying a first weight to the first measurement;
   deriving a second weighted measurement by applying a second weight to the second measurement, the first weight being greater than the second weight; and
   deriving the combined measurement as a function of the first weighted measurement and the second weighted measurement.

4. The method of claim 1, wherein the combined measurement is indicative of a combined total throughput available to the wireless communication device from a combination of the primary carrier and the secondary carrier.

5. The method of claim 1, wherein the first measurement is a carrier-to-noise ratio ($E_c/N_o$) measurement of the primary carrier, the second measurement is an $E_c/N_o$ measurement of the secondary carrier, and the combined measurement is a combined $E_c/N_o$ measurement.

6. The method of claim 1, wherein the primary carrier is a primary carrier of a serving cell, wherein the secondary carrier is a secondary carrier of the serving cell, and wherein reporting the combined measurement comprises reporting a measurement of the serving cell.

7. The method of claim 1, wherein the primary carrier is a carrier of a neighbor cell, wherein the secondary carrier is a carrier of the neighbor cell, and wherein reporting the combined measurement comprises reporting a measurement of the neighbor cell.

8. The method of claim 1, wherein reporting the combined measurement comprises reporting the combined measurement in a measurement report usable by the serving network to make a cell selection decision for the wireless communication device.

9. The method of claim 1, wherein reporting the combined measurement comprises reporting the combined measurement in an Event 1$d$ report.

10. A wireless communication device comprising:
    a transceiver configured to transmit data to and receive data from a serving network; and
    processing circuitry coupled with the transceiver, the processing circuitry configured to control the wireless communication device to at least:
       perform a first measurement of a primary carrier;
       report the first measurement to the serving network in an instance in which the primary carrier has a different synchronization code than a secondary carrier; and
       in an instance in which the primary carrier has a same synchronization code as the secondary carrier:
          perform a second measurement of the secondary carrier;
          derive a combined measurement as a function of the first measurement and the second measurement; and
          report the combined measurement to the serving network.

11. The wireless communication device of claim 10, wherein the processing circuitry is configured to control the wireless communication device to derive the combined measurement at least in part by controlling the wireless communication device to average the first measurement and the second measurement.

12. The wireless communication device of claim 10, wherein the processing circuitry is configured to control the wireless communication device to derive the combined measurement at least in part by controlling the wireless communication device to:
    derive a first weighted measurement by applying a first weight to the first measurement;

derive a second weighted measurement by applying a second weight to the second measurement, the first weight being greater than the second weight; and derive the combined measurement as a function of the first weighted measurement and the second weighted measurement.

13. The wireless communication device of claim 10, wherein the combined measurement is indicative of a combined total throughput available to the wireless communication device from a combination of the primary carrier and the secondary carrier.

14. The wireless communication device of claim 10, wherein the first measurement is a carrier-to-noise ratio ($E_c/N_o$) measurement of the primary carrier, the second measurement is an $E_c/N_o$ measurement of the secondary carrier, and the combined measurement is a combined $E_c/N_o$ measurement.

15. The wireless communication device of claim 10, wherein the primary carrier is a primary carrier of a serving cell, wherein the secondary carrier is a secondary carrier of the serving cell, and wherein the processing circuitry is configured to control the wireless communication device to report the combined measurement in a measurement report for the serving cell.

16. The wireless communication device of claim 10, wherein the primary carrier is a carrier of a neighbor cell, wherein the secondary carrier is a carrier of the neighbor cell, and wherein the processing circuitry is configured to control the wireless communication device to report the combined measurement in a measurement report for the neighbor cell.

17. The wireless communication device of claim 10, wherein the processing circuitry is configured to control the wireless communication device to report the combined measurement in a measurement report usable by the serving network to make a cell selection decision for the wireless communication device.

18. A non-transitory computer readable storage medium comprising computer program code stored thereon, the computer program code, when executed by a processor, causing a wireless communication device to:

perform a first measurement of a primary carrier;

report the first measurement to a serving network in an instance in which the primary carrier has a different synchronization code than a secondary carrier; and in an instance in which the primary carrier has a same synchronization code as the secondary carrier:

perform a second measurement of the secondary carrier;

derive a combined measurement as a function of the first measurement and the second measurement; and report the combined measurement to the serving network.

19. The non-transitory computer readable storage medium of claim 18, wherein derive the combined measurement comprises average the first measurement and the second measurement.

20. The non-transitory computer readable storage medium of claim 18, wherein derive the combined measurement comprises:

derive a first weighted measurement by applying a first weight to the first measurement;

derive a second weighted measurement by applying a second weight to the second measurement, the first weight being greater than the second weight; and derive the combined measurement as a function of the first weighted measurement and the second weighted measurement.

* * * * *